United States Patent [19]

Warmerdam

[11] Patent Number: 5,066,208
[45] Date of Patent: Nov. 19, 1991

[54] PIPE JOINT TESTING AND GROUTING UNIT

[76] Inventor: Gerard G. Warmerdam, 17400 N. Bowser Rd., Lodi, Calif. 95240

[21] Appl. No.: 505,702

[22] Filed: Apr. 5, 1990

[51] Int. Cl.$^5$ .......................................... F16L 55/162
[52] U.S. Cl. ........................................ 425/13; 73/46; 138/93; 138/98; 249/65; 264/36; 264/269; 285/15; 425/457
[58] Field of Search ............... 138/93, 97, 98; 264/36, 264/45.2, 46.9, 269.; 425/13, 170, 417, 470, 289, 457; 239/397, 587; 285/15, 31, 32, 165, 423; 73/37, 46; 249/65

[56] References Cited

U.S. PATENT DOCUMENTS

| | | | |
|---|---|---|---|
| 675,320 | 5/1901 | Boyne | 285/32 |
| 1,036,684 | 8/1912 | Mueller et al. | 285/32 |
| 1,191,886 | 7/1916 | Glauber | 285/32 |
| 3,103,235 | 9/1963 | Stringham | 138/97 |
| 3,168,909 | 2/1965 | Zurbrigen et al. | 138/97 |
| 3,269,421 | 8/1966 | Telford et al. | 138/97 |
| 3,750,711 | 8/1973 | Conklin et al. | 138/97 |
| 3,762,446 | 10/1973 | Tungsoth et al. | 138/97 |
| 3,834,421 | 9/1974 | Daley | 138/97 |
| 3,834,422 | 9/1974 | Larson | 138/93 |
| 4,245,970 | 1/1981 | St. Onge | 264/45.2 |
| 4,318,835 | 3/1982 | Clarke | 264/36 |
| 4,421,698 | 12/1983 | Vanderlans | 264/40.1 |
| 4,602,659 | 7/1986 | Parkyn, Sr. | 138/93 |
| 4,627,471 | 12/1986 | Parkes et al. | 138/97 |
| 4,763,511 | 8/1988 | Mathison et al. | 138/93 |
| 4,793,557 | 12/1988 | Marchese et al. | 239/587 |

FOREIGN PATENT DOCUMENTS

| | | |
|---|---|---|
| 1406736 | 9/1975 | United Kingdom . |
| 2080917 | 2/1982 | United Kingdom . |

*Primary Examiner*—Jay H. Woo
*Assistant Examiner*—Robert B. Davis
*Attorney, Agent, or Firm*—Bielen, Peterson & Lampe

[57] ABSTRACT

A pipe joint pressurizing unit for testing pipe joints and grouting pipe joints with grout, the pressurizing unit having a rigid cylindrical core member with an expandable rubber sleeve mounted on the outside of the core member with a telescoping component for delivering a fluid such as air or grout to the outside of the expandable sleeve, the telescoping conduit including an outlet pipe slidably installed in a guide tube, the outlet pipe having a distal end connected to the expandable sleeve and slidable in the guide tube on expansion of the sleeve, with an o-ring seal sealing between the guide tube and the outlet pipe while permitting the outlet pipe to slide in the guide tube on expansion of the sleeve.

6 Claims, 2 Drawing Sheets

PIPE JOINT TESTING AND GROUTING UNIT

BACKGROUND OF THE INVENTION

This invention relates to joint testers and grouting devices including combinations of such units. In particular this invention provides a conduit component through an expandable bladder enabling a communication passage to be maintained for testing or grouting the pipe joint.

The pipe joint pressurizing unit of this invention is devised to be inserted into a pipe such as a sewer pipe or other conduit having periodic joints. While the unit can be inserted into continuous pipes for repairing leaks, it is most suitable for pressure testing joints with air or water, and in one preferred embodiment, grouting the joint from inside the pipe and packing the grout.

Certain prior art devices have been utilized for testing and grouting pipes. For example, Stringham U.S. Pat. No. 3,103,235 issued Sept. 10, 1963 discloses a unit of the type proposed. As described therein a rigid cylindrical core has an outer surface where an elongated, expandable sleeve circled with bands along a middle section and at each end section, is circumferentially positioned. In use the device is located inside a pipe and positioned with its center section at a pipe joint. Each end section is expanded with compressed air sealing an annular center void. A grout from one or more supply lines is injected through the cylindrical core, sleeve and central band to fill the void and fill the joint. This packer, however, leaves a ring of grout on the inside of the pipe at the middle section.

In Zurbrigen et al, U.S. Pat. No. 3,168,909, issued Feb. 9, 1965 a device having a similar construction is provided with the means for elimination of the center band with only a small, washer-like plate holding the expandable sleeve against the rigid cylindrical core at the conduit end. As a result of grouting only a local pocket of grout remains. It is suggested this injection point may be blown clean by water after deflating the sleeve.

One construction for eliminating this pocket is provided in the device disclosed in Vanderlans, U.S. Pat. No. 4,421,698. Here the end of the conduit is connected to the surface of the expandable sleeve and moveably passes through the rigid cylindrical core. The conduit has a collar within the confines of the sleeve that has two annular, disk-like rubber diaphragms that attach to the sleeve and to the core. This double cuff arrangement enables displacement of the conduit through an oversized opening in the core, while maintaining a diaphragm seal of the conduit from the remainder of the air chamber that is formed between the sleeve and the core on inflation. This configuration may be subject to failure at the rubber diaphragms, a location difficult to repair.

The joint tester and grouting unit of this invention utilizes a simpler construction for the conduits that must pass through the inflatable and expandable sleeve to the zone between the pipe and the unit at the location of the pipe joint. The construction is simpler to repair and enables extremely high pressures to be used, while maintaining a seal with standard, easily replaceable, component elements.

SUMMARY OF THE INVENTION

This invention relates to joint testers and grouting devices and in particular to a device that can pressure test joints in a multiple of different size pipes and in the preferred unit, grout the joint tested. The joint tester and grouting unit of this invention utilizes a rigid cylindrical core that has a hollow interior chamber for running various conduits and, if desired for larger diameter units, test gauges and valves. On this rigid core is mounted an inflatable and expandable annular sleeve, which in certain embodiments has multiple compartments.

In the simplest embodiment, where the device is used simply as a pressure tester, a single annulus encompasses a rigid cylindrical, tube-like core in a similar manner that an inflatable wide tire is mounted on a wide wheel rim. To enable the device to test a broad range of diameters of pipes the annulus or inflatable bladder must expand to engage the interior wall of the pipe and firmly seal a section of the pipe. In operation, the unit is positioned in a pipe and centered with an equal part of the bladder on each side of the joint to be tested. After inflation to seal each side of the joint, air or water is then introduced through a center section of the bladder and forms a test zone around the bladder, between the bladder and the pipe. If the joint does not have a grooved recess, the bladder will deform to form a chamber around the center of the bladder.

Once a desired pressure is reached, the pressure is monitored to determine if the fluid is leaking through the joint resulting in a decline in pressure.

In the preferred embodiment, the test zone can be filled with grout and packed to seal a detected leak. In both devices it is necessary to provide a conduit that passes from inside the rigid core to the outside of the encircling bladder. Since the distance between these two places varies according to the degree of expansion of the bladder a device must be installed to accommodate for these variations.

Applicant has found that a telescoping-type action of a movable inner pipe and a stationary outer pipe fixed to the central core, when properly sealed with a compressed o-ring, will enable a direct passage to be formed for delivery of fluid from inside the core to the outer surface of the bladder. This construction is used both in the simple joint testing unit or in the combination joint tester and grouting unit. As the bladder expands, the flow conduit joined at its distal end to the outer sleeve of the bladder, will displace in the short section of guide tube fixed to the rigid inner core.

In the preferred embodiment of the combination joint tester and grouting unit a three chamber system is used with two end chambers inflated to seal each side of a joint to be grouted. A center chamber can be partially inflated and, if desired, a fluid, water or air, forced through the grouting conduit or outlet pipe to the zone of the joint to determine whether there is a leak by monitoring the pressure of the fluid after a predetermined pressure is reached. After vacating the zone by allowing the fluid to return though an open return line on pressurizing the center chamber against the pipe into the zone of the joint, the mixed grout is forced into the zone and penetrates the joint and any breach in the joint. The center chamber may then, if desired, be further inflated to pack any grout in the void flat against the pipe. The three chamber system provides a versatile unit to enable a variety of procedures to be utilized by operators. In this manner the desired auxiliary equipment such a gauges, monitoring equipment, remote visualizing systems and other components may be combined with the basic expansion unit described to accomplish standard and custom test procedures or grouting operations.

The preferred embodiments of the expansion unit are described in greater detail in the detailed description of the invention that follows.

DETAILED DESCRIPTION OF THE PREFERRED EMBODIMENTS

Figure 1:
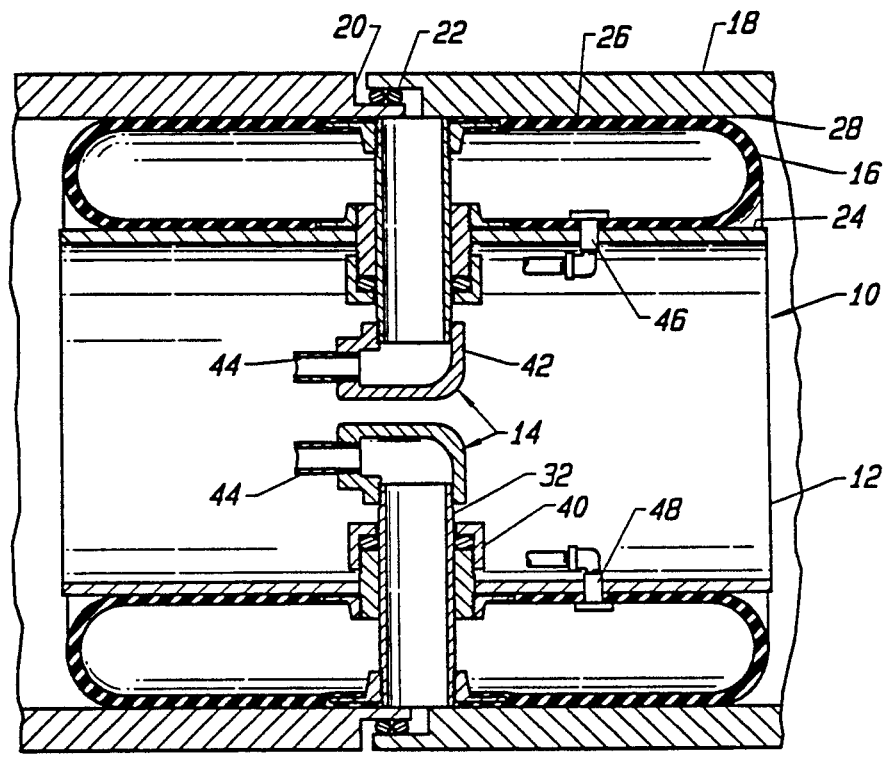
FIG. 1 is a cross sectional view of the pipe joint pressurizing unit with a simple test bladder construction in a pipe.

Referring to FIG. 1, of the drawings, the pipe joint pressurizing device of this invention, designated generally by the reference numeral 10, is a pressure tester unit 12 that includes the novel flow-through pipe component 14 to enable supply of a test fluid through an expandable bladder 16. The tester unit 12 is positioned within a sectioned pipe 18 and centered on a joint 20 between two sections of pipe. The joint is packed with rubber ring seals 22 and ready to be tested. The expandable bladder 16 is mounted on a rigid hollow cylindrical core 24 and is shown in its expanded condition with its outer surface 26 against the inside wall 28 of the pipe 18.

While the tester unit is designed to test pipe of different diameters, within a certain range, several standard sizes of the unit are contemplated with minor variations in construction. Because the expansion of the bladder is not extraordinary, conventional rubber formulations can be used, preferable having a hardness with a durometer reading of 40 or 50. These formulations should be of natural rubber and are obtainable from Master Processing of Long Beach, Calif. Where non-water environments are being tested a special synthetic rubber may be required to be formulated according to the substance encountered.

In the joint tester bladder 16 multiple plies of rubber material form the annulus configuration and it is preferred that the bladder have at least one inner layer of tire cord impregnated sheet with the cord oriented substantially in axial alignment with the axis of the cylindrical core member to prevent expansion of the bladder longitudinally along the length of the cylindrical core. In this manner the annular tube can expand outwardly and exert a sealing force against the wall of the pipe without squeezing out the open area at each end between the rigid core and the inner wall of the pipe.

The fluid is supplied through the flow-through pipe components 14 which are located at the top and bottom of the tester unit 12. When air is used as the tester fluid only one pipe component is required. When water is used, the top pipe component 14 is used as a vent to vent trapped air to atmosphere.

Figure 4:
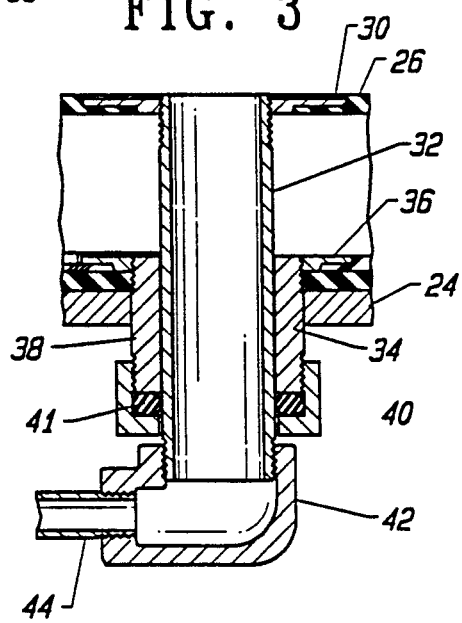
FIG. 4 is an enlarged partial view of the outlet pipe in FIG. 1.

Each pipe component 14 as shown enlarged in FIG. 4 is constructed with a threaded flange 30 imbedded in the bladder 16 at the outer surface 26. An outlet pipe 32 is threaded to the flange and extends through an opening 34 in the core 24. At the opening is another flange 36 imbedded in the bladder and threaded to accept a larger diameter nipple 38. The nipple 38 extends into the open center part of the core 24. The inside diameter of the nipple is sized to allow sliding engagement of the outlet pipe 32 with the nipple. The nipple has a packing nut 40 through which the outlet pipe 32 projects. The packing nut 40 contains an o-ring 41 to seal the pipe 32 and nipple with adjustment allowed according to pressures evolved.

The end of the outlet pipe 32 connects to a elbow 42 which connects to a feed line 44 that runs to appropriate valves and gauges (not shown) to conduct the tests desired.

Similarly, a smaller flanged conduit 46 is installed though the core 24 and to the inside of the bladder 16 to provide for expansion of the bladder 16 by a fluid, preferably air. If water is used, a second conduit 48 is installed through the bottom of the core 24 to allow water to be extracted when the bladder is collapsed and drained. Again, the conduits 46 and 48 are connected to valves and gauges (not shown) to accomplish the tests desired by the operators.

Figure 2:
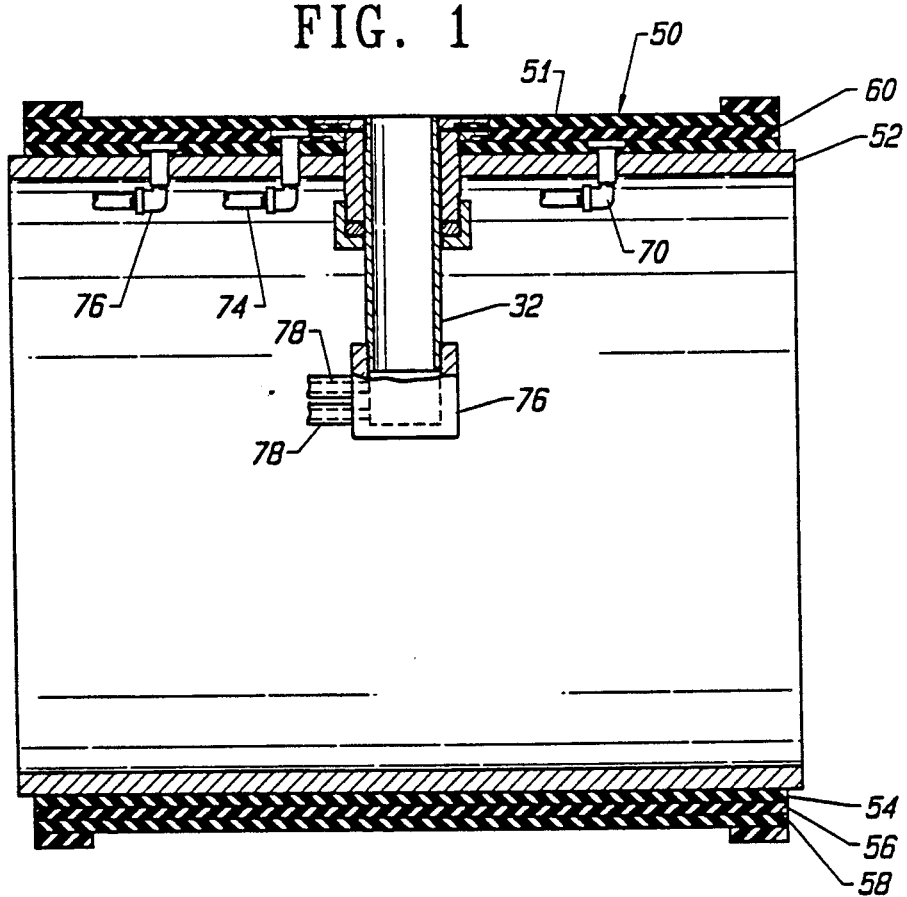
FIG. 2 is a cross sectional view of the pipe joint pressurizing unit with a combination testing and grouting construction with the pressure bladder in a relaxed state.
Figure 3:
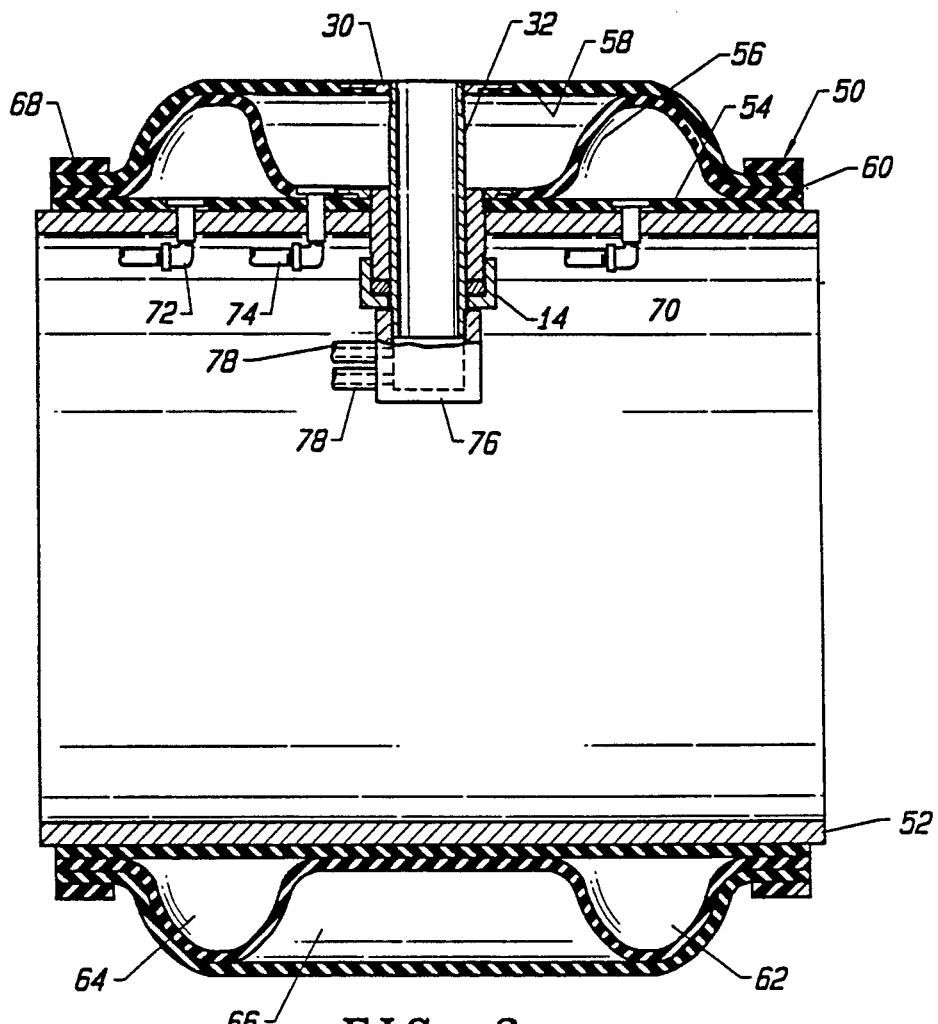
FIG. 3 is a cross sectional view of the pipe joint pressurizing unit of claim 3 with the pressure bladder in an expanded state.

Referring now to FIGS. 2 and 3, the pipe joint pressurizing device of this invention is shown in the embodiment of the combination tester and grouting unit 50. The unit is shown in FIG. 3 with an expansion member 51 in its deflated state, including a rigid, hollow, cylindrical core 52 with three sleeve layers, 54, 56 and 58 vulcanized together at each end 60 where it is bonded to the core. Where it is not desired that the sleeve layers 54, 56 and 58 be vulcanized together, as shown in FIG. 3, where the expansion member 51 is in an inflated state, a masking tape is wrapped around the selected section of the inner layer.

In FIG. 3 the three sleeve layers form three chambers 62, 64 and 66. The two end chambers 62 and 64 are formed between the inner sleeve layer 54, which remains against the core, and the middle sleeve layer 56, which is also vulcanized in a central segment to the inner sleeve layer to permit formation of the two end wire chambers. The outer sleeve layer 58 is vulcanized at its ends to the middle sleeve layer 56 to enable formation of the central chamber 66. Around the ends of the expansion member 51 are metal bands 68, which clamp the ends to the core 52 to insure that there is no breach. The bands may alternately be fabricated with wire impregnated rubber with the wire running circumferentially around the member to prevent stretching.

Each of the three chambers 62, 64 and 66 is provided with a conduit 70, 72 and 74 to supply a fluid for inflation of the chambers and pressurized fluid supply auxiliary component required by the operator for the particular testing and grouting procedures desired.

The three sleeve layers are again preferably fabricated from natural rubber, with the inner layer 54 formed form a ⅛" sheet, the middle layer 56 formed from an inner and outer ⅛" sheet sandwiching two center layers of multi-fibre sheets having segmented cord oriented longitudinal to the axis of the cylindrical core, and, the outer layer formed from an inner and outer ⅛" sheet sandwiching an unbroken cord sheet with the tire cord oriented longitudinal to the axis of the cylindrical core.

In a similar manner as the tester unit, the combination grouting and testing unit has an identical pipe component 14 with the outlet pipe 32 threaded to the flange 30 imbedded in the outer sleeve layer 58, allowing a free passage to the outside of the expansion member. The opposite end of the outlet pipe 32 is connected to an elbow 76 fashioned with two conduit connectors 78 to permit the two components of the grout formulation to be discharged into the outlet pipe for mixing before the mixture is discharged into the zone of the pipe joint.

What is claimed is:

1. A pipe joint pressurizing unit comprising:
   a) a rigid cylindrical core member, having an inside surface and an outside surface;
   b) an expandable sleeve mounted on the outside surface of the core member, the expandable sleeve having an outer surface that is displaceable from the outside surface of the core member;
   c) means for expanding the expandable sleeve from the surface of the core member, and;
   d) a telescoping pipe component providing a flow-through passage from the inside of the core member to the outside of the expandable sleeve, the telescoping pipe component including a rigid guide tube on the core member and a rigid outlet pipe slidably installed through the guide tube, the outlet pipe having a distal end connected to the expandable sleeve and an opposite end located inside the core member, and the guide tube having sealing means with a deformable sealing element for sealing between the guide tube and outlet pipe and permitting the outlet pipe to slide in the guide tube on expansion of the sleeve, the outlet pipe slidably engaging the deformable sealing element of the sealing means on displacement of the pipe in the guide tube on expansion of the sleeve while maintaining a seal between the guide tube and outlet pipe.

2. The pipe pressurizing unit of claim 1 wherein the guide tube comprises a pipe nipple and the sealing means comprises a packing nut with an internal o-ring that engages the slidable outlet pipe.

3. The pipe joint pressurizing unit of claim 1 wherein the expandable sleeve comprises an annulus configured bladder with a single inflatable chamber.

4. The pipe joint pressurizing unit of claim 1 wherein the expandable sleeve comprises three sleeve layers joined together at their ends, bonded to the core at the joined ends, and interconnected to form three discrete inflatable chambers.

5. The pipe joint pressurizing unit of claim 4 wherein the three sleeve layers include an inner layer interfacing the core member, a middle layer having ends and a center section joined to the inner layer, and an outer layer having ends joined to the ends of the middle layer.

6. The pipe joint pressurizing unit of claim 4 wherein the means for expanding the expandable sleeve for the three sleeve layers joined together at their ends comprises a fluid supply means connected to each of the three discrete inflatable chambers.

* * * * *